(12) United States Patent
Truong

(10) Patent No.: US 10,795,626 B2
(45) Date of Patent: Oct. 6, 2020

(54) HIGH PRIORITY PRINTING USING EXTERNAL INTERPRETER AND PAGE DESCRIPTION LANGUAGE

(71) Applicant: KYOCERA Document Solutions, Inc., Osaka (JP)

(72) Inventor: Duc Phu Truong, West Covina, CA (US)

(73) Assignee: KYOCERA Document Solutions, Inc., Osaka (JP)

( * ) Notice: Subject to any disclaimer, the term of this patent is extended or adjusted under 35 U.S.C. 154(b) by 0 days.

(21) Appl. No.: 16/281,979

(22) Filed: Feb. 21, 2019

(65) Prior Publication Data

US 2020/0272389 A1  Aug. 27, 2020

(51) Int. Cl.
*G06F 3/12* (2006.01)
*G06F 21/60* (2013.01)

(52) U.S. Cl.
CPC .......... *G06F 3/1263* (2013.01); *G06F 3/1206* (2013.01); *G06F 3/1248* (2013.01); *G06F 3/1259* (2013.01); *G06F 3/1298* (2013.01); *G06F 21/602* (2013.01); *G06F 3/1288* (2013.01)

(58) Field of Classification Search
CPC ...... G06F 3/126; G06F 3/1263; G06F 3/1259; G06F 21/602; G06F 3/1298; G06F 3/1244; G06F 3/1248; G06F 3/1206; G06F 3/1288; G06F 3/1292
See application file for complete search history.

(56) References Cited

U.S. PATENT DOCUMENTS

| 7,265,855 | B2 * | 9/2007 | Patton | G06F 3/1204 358/1.15 |
| 9,661,170 | B2 * | 5/2017 | Mitsuyama | H04N 1/00915 |
| 2003/0020944 | A1 * | 1/2003 | Bhogal | G06F 3/1204 358/1.15 |
| 2015/0242168 | A1 * | 8/2015 | Yu | G06F 3/1203 358/1.13 |

\* cited by examiner

*Primary Examiner* — Kent Yip
(74) *Attorney, Agent, or Firm* — Rowan TELS LLC

(57) ABSTRACT

A method and apparatus for interrupting a print job in progress to immediately print a higher priority job utilizes an interpreter installed on an external hardware device to pre-process the higher priority job. When a high priority job is present, the external interpreter may convert page description language (PDL) data from the high priority job to raster data. Processing time needed to begin the high priority job is reduced and wait time to resume the interrupted job is minimized.

20 Claims, 7 Drawing Sheets

HIGH PRIORITY PRINTING USING EXTERNAL INTERPRETER AND PAGE DESCRIPTION LANGUAGE

BACKGROUND

The methods and printing apparatus disclosed here relate to printing in a computer network or commercial environment and controlling the priority of print jobs in such an environment.

Printing resources are often shared, with many users attempting to use the printers at the same time. As a result, a single user printing a large job may easily become a bottleneck, preventing other users with more urgent needs from printing their documents. Similar problems may be encountered in a commercial print shop. While a commercial printer may have relatively few "users" in terms of personnel operating printing equipment, they may have many customers with demands to be met. A large job of average priority may be in progress when a rush order is received. In such a case, there may be no alternative equipment available to process the high priority job, especially if more specialized printing equipment is required, making the larger job a bottleneck to delivering priority service to a client in need.

Typically, print jobs are ordered according to the time that the request for printing is received by the control system (first in—first out or "FIFO"). A number of solutions allow a reordering of jobs in a print queue, such that a high priority job may be moved into the next job position, to be started once the current job completes. Printing controllers may also be programmed to prioritize jobs according to the time required to print the job. For example, a shorter job might be printed first. The printing controller may also put print jobs requiring binding first or last in the print queue or may queue jobs as a function of the availability of the required print media in the printer. Printing controllers may also permit a user to arbitrarily change the order of printing jobs in the print queue. In all of these cases, however, the high priority job may still not begin until the job in progress is complete. If the job in progress has a high page count, or requires a number of large graphics to print, it may still present a bottleneck to more urgent jobs.

Immediately-effective job prioritization may be accomplished by manually cancelling large jobs in progress to free printing resources for high priority jobs. This method has a number of drawbacks. Data from the job in progress may be lost, making it necessary to manually restart and reprocess all or a large portion of the job again once the printer is free. If multiple jobs are in the print queue ahead of a high priority job, each of these may also need to be cancelled and manually restarted. This method may require broad communication to numerous parties to make them aware, first, of the need to push a high priority job through, and, then, of the need to manually restart any jobs cancelled in the process.

Conventional automated solutions for interrupting jobs in progress to start high priority jobs use the same local interpreter logic, implemented on the printer or Multifunction Peripheral (MFP) firmware, to process both the current jobs and the high priority job. The disadvantage of this method is that the memory and resources allocated to the current job must be written to a hard drive disk. Next, 100% of local interpreter capacity may be needed to translate the high priority job Page Description Language (PDL) data into raster data and send the raster data to the print engine so the pages may be printed. Finally, when the interrupted task is resumed, all resources and memory written to disk may need to be restored to RAM in the exact locations they resided in at the time the job was interrupted. Both the process of writing resources to disk and the process of restoring them from disk may take a long time if the interrupted job is large.

There is a need for a solution that allows immediate printing of high priority jobs while minimizing the disruption of the jobs in progress as well as the restart time once the high priority job is complete.

BRIEF SUMMARY

This disclosure relates to a method of prioritizing printing jobs. A current print job may be paused on a printer, wherein the printer includes a print engine, and the current print job includes a plurality of pages. An external interpreter on an external device may be pinged for a print job status comprising an existence of a pending high priority print job for the printer, wherein the external interpreter includes logic to generate high priority raster data from a page description language (PDL). The print job status may be applied to a priority determination unit, wherein the priority determination unit includes logic to determine if a high priority print job exists or does not exist and to generate executable printing instructions for the printer and the external interpreter. On condition that a high priority job exists, executable printing instructions may comprise operating the external interpreter to generate high priority raster data for the high priority print job, receiving the high priority raster data for the high priority print job from the external interpreter, operating the print engine on the high priority raster data to generate at least one high priority page, operating the printer to print the at least one high priority page, and executing the printing instructions. On condition that a high priority print job does not exist, executable printing instructions may comprise operating the printer to print one page from the current print job and executing the printing instructions.

This disclosure further relates to a method of printing wherein a socket connection is created on a printer firmware of a printer to interface with an external hardware device application (app) or a cloud printer server. A current print job may be paused on the printer, wherein the printer includes a print engine, and the current print job includes a plurality of pages. A function call to handshake with the external hardware device app or to POST a message to the cloud printer server may be initiated. The external hardware device app and the cloud printer server may include an external interpreter comprising logic to generate high priority raster data from page description language (PDL) data, print job status, and a priority determination unit. The priority determination unit may include logic to determine if a high priority print job exists or does not exist using the print job status and to generate executable printing instructions for the printer. On condition that a high priority print job exists, the executable printing instructions may comprise operating an application programming interface (API) to query at least one of the external hardware device app and the cloud printer server for high priority raster data of the high priority print job, operating the external interpreter to generate high priority raster data for the high priority print job, relaying the high priority raster data to the print engine, operating the print engine on the high priority raster data to generate at least one high priority page, operating the printer to print the at least one high priority page, and executing the printing instructions. On condition that a high priority print job does not exist, the executable printing instructions may comprise operating the printer to print one page from the current print job, and executing the printing instructions.

This disclosure relates to a printing apparatus comprising a processor, a print engine, and a memory. The memory may store instructions that, when executed by the processor, configure the printing apparatus to pause a current print job on the printing apparatus, wherein the current print job includes a plurality of pages. An external interpreter on an external device may be pinged for a print job status comprising an existence of a pending high priority print job for the printing apparatus. The external interpreter may include logic to generate high priority raster data from a page description language (PDL). The print job status may be applied to a priority determination unit, wherein the priority determination unit includes logic to determine if a high priority print job exists or does not exist and to generate executable printing instructions for the printing apparatus and the external interpreter. On condition that a high priority print job exists, the executable printing instructions may comprise operating the external interpreter to generate high priority raster data for the high priority print job, receiving the high priority raster data for the high priority print job from the external interpreter, operating the print engine on the high priority raster data to generate at least one high priority page, operating the printing apparatus to print the at least one high priority page, and executing the printing instructions. On condition that a high priority print job does not exist, the executable printing instructions may comprise operating the printing apparatus to print one page from the current print job, and executing the printing instructions.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
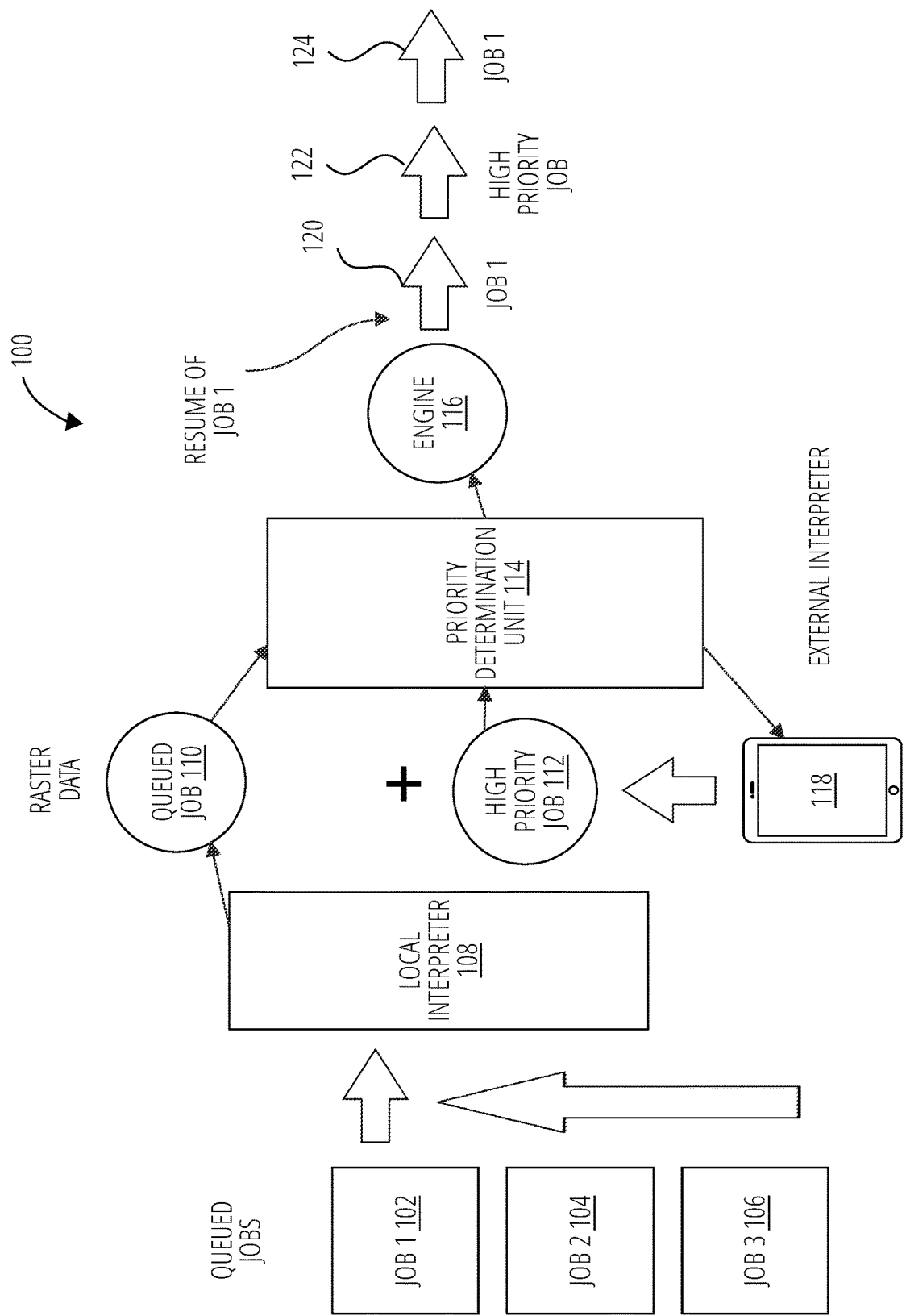
FIG. 1 illustrates a printing system 100 in accordance with one embodiment.

"API" refers to an Application Programming Interface, which is a communication and control interface between two logic components.

"Circuitry" refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Cloud printer server" or "cloud printing" refers to a device and technology that enables printers to be accessed over a network through cloud computing.

"CPU" refers to Central Processing Unit.

"Firmware" refers to software logic embodied as processor-executable instructions stored in read-only memories or media.

"Hardware" refers to logic embodied as analog or digital circuitry.

"HTTP" refers to HyperText Transfer Protocol.

"Logic" refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"MFP" refers to a Multifunction Peripheral, which serves as an image forming apparatus.

"PC" refers to a Personal Computer.

"PDL" refers to a Page Description Language such as PostScript.

"Print engine" refers to logic of a printer that translates a printer controller's signals into the printed image.

"RAM" refers to Random-Access Memory.

"Raster data" refers to binary image data that may be used to produce a bitmap, which may be used to store a binary image. Typically, a raster image processor is used to transform PDLs into raw binary pixels that form a binary image where each pixel is, for example, either black or white, or a multi-dimensional (e.g., 6D) spatial and color value.

"Socket connection" refers to logic implementing a full-duplex endpoint for sending or receiving data within a node on a computer network, typically but not necessarily using the TCP/IP protocol.

"Software" refers to logic implemented as processor-executable instructions in a machine memory (e.g. read/write volatile or nonvolatile memory or media).

The methods and printing apparatus disclosed here comprise a high priority job printing mechanism on a printer controller or an MFP controller with minimal software changes to existing controller firmware. The methods of this invention may work by utilizing an interpreter installed on an external hardware device to pre-process the high priority job. When a high priority job is present, the external interpreter may convert the PDL data of the high priority job to raster data.

The external hardware device on which the external interpreter is implemented may be a smart phone, a laptop, or a PC. The external interpreter may be implemented as a software program, such as an external hardware device application (app). In another embodiment of the invention, the rasterization of high priority job may be performed by a cloud service that may run its own interpreter program on the cloud service server. This method eliminates the need for the external hardware device at customer's premise. In this case, the raster data of the high priority job may be sent to the printer or MFP from the cloud service server through Web HTTP.

Changes to the firmware may be required for some printers to interact with the external interpreter that allows printing of a high priority print job. Where changes in printer firmware may be needed, a socket connection may be created to interface with the external hardware device app or cloud printer server. A function call may then be added after a page of the current print job.

In embodiments using an external hardware device app or interpreter program to connect to the local interpreter, the function call may perform a handshake with the external hardware device app to determine if there is a high priority job available from the app. If the function call returns a "Yes", the current print job may not be processed further, and an API may be used to query the external hardware device app for high priority raster data. The high priority raster data may be relayed to the print engine for printing.

In embodiments using a cloud printer service, the function call may POST a message to the cloud printer server to determine if there is a high priority job available from the server. If the server replies with a "Yes", the current print job may not be processed further, and a cloud printer server API may be used to query the cloud printer server for high priority raster data. The high priority raster data may be relayed to the print engine for printing.

When a high priority job is present, the external interpreter may convert the page Description Language (PDL) data of the high priority job to raster data. The high priority raster data may be sent to directly to the print engine to be printed immediately, without being processed through the printer's local interpreter module. The high priority raster data may be encrypted, in which case the printer may decrypt the data before printing. In some embodiments, high priority raster data may be encrypted. In such cases, the print engine may decrypt the high priority raster data before printing. Alternately, the high priority raster data may also be compressed to allow for shorter data transfer time intervals, in which case the printer decompresses the data before printing it.

Since the local interpreter on the MFP may thus be freed from converting PDL data to raster data, the local interpreter may be "paused" or put in a standby mode in the state at which it was interrupted. Once the high priority job is complete, the local interpreter may resume printing the interrupted job at the exact point where it left off. Thus, the methods and apparatus disclosed here also expedite resumption of the interrupted job.

The conventional method for printing a high priority job is to save the current print job by writing the current memory allocations and resources of that job to a hard disk, then use the local interpreter to convert the high priority job PDL data to raster data. When the interrupted job is resumed, the resources and allocations written to hard disk may need to be restored to RAM in the exact locations they resided at when the job was interrupted. Both the process of saving to and restoring from hard disk may take a long time if the interrupted job is large.

Incorporating a "secondary" interpreter may allow high priority raster data to be sent to directly to the print engine and printed immediately, without being processed through the printer's local interpreter module.

The difference between pausing a job, as accomplished by the methods of this invention, and saving and restoring the job as is conventionally done may be significant. For example, if a job of 1,000 pages is interrupted after 999 pages have been printed, restoring the saved data may require the local interpreter to process 999 pages again without printing them. This may take more than ten minutes on a typical MFP.

The methods and printing apparatus of this invention do not require any data to be written to disk. All local interpreter resources remain in place in RAM. The local interpreter simply stops its execution process and yields CPU power to the process routing raster data from the external interpreter to the print engine. Once all high priority raster data has been printed by the print engine, the local interpreter may immediately resume rendering the interrupted job exactly where it was interrupted. The result is a significant improvement in time savings when there is an urgent need to print a high priority job, both in starting the high priority job immediately, and in resuming interrupted jobs once the high priority print job is complete.

The solution disclosed here to meet these challenges comprises methods and a printing apparatus. An embodiment of a method of prioritizing printing jobs may begin with pausing a current print job on a printer, wherein the printer includes a print engine, and the current print job includes a plurality of pages. An external interpreter on an external device may then be pinged for a print job status comprising an existence of a pending high priority print job for the printer, wherein the external interpreter includes logic to generate high priority raster data from a page description language (PDL). The print job status may be applied to a priority determination unit, wherein the priority determination unit includes logic to determine if a high priority print job exists or does not exist and to generate executable printing instructions for the printer and the external interpreter. On condition that a high priority job exists, executable printing instructions may comprise receiving the high priority raster data for the high priority print job from the external interpreter, operating the print engine on the high priority raster data to generate at least one high priority page, operating the printer to print the at least one high priority page, and executing the printing instructions. On condition that a high priority print job does not exist, executable printing instructions may comprise operating the printer to print one page from the current print job and executing the printing instructions.

An embodiment of the method may include pinging the external interpreter on the external device again, after executing the printing instructions, to provide a new print job status regarding the existence of a new high priority print job for the printer. The new print job status may then be applied to the priority determination unit to generate executable new printing instructions. The new printing instructions may be executed.

An embodiment of the method may include receiving encrypted high priority raster data. The encrypted high priority raster data may be decrypted using the printer, thereby generating decrypted pages. The decrypted pages may then be printed on the printer.

In an embodiment of the method, the external interpreter may be a software program installed on the external device. The external device may be at least one of a smart phone, a laptop, a personal computer, a cloud server, and combinations thereof.

An embodiment of the method may include executing the printing instructions for the high priority print job, including printing all of the at least one high priority pages with the printer. A local interpreter installed on the printer may generate raster data from PDL data used in printing the page in the current print job by the print engine. The local interpreter may be in standby mode during the generating of the high priority raster data for the high priority print job.

An embodiment of a method of printing may begin with creating a socket connection on a printer firmware of a printer to interface with an external hardware device application (app) or a cloud printer server. A current print job may then be paused on the printer, wherein the printer includes a print engine, and the current print job includes a plurality of pages. A function call to handshake with the external hardware device app or to POST a message to the cloud printer server may be initiated. The external hardware device app and the cloud printer server may include an external interpreter comprising logic to generate high priority raster data from page description language (PDL) data, print job status, and a priority determination unit. The priority determination unit may include logic to determine if a high priority print job exists or does not exist using the print job status and to generate executable printing instructions for the printer. On condition that a high priority print job exists, the executable printing instructions may comprise operating an application programming interface (API) to query at least one of the external hardware device app and the cloud printer server for high priority raster data of the high priority print job, operating the external interpreter to generate high priority raster data for the high priority print job, relaying the high priority raster data to the print engine, operating the print engine on the high priority raster data to generate at least one high priority page, operating the printer to print the at least one high priority page, and executing the printing instructions. On condition that a high priority print job does not exist, the executable printing instructions may comprise operating the printer to print one page from the current print job, and executing the printing instructions.

An embodiment of the method may include initiating a new function call to handshake with the external hardware device app after executing the printing instructions. A new print job status may be obtained from the external hardware device app regarding the existence of a new high priority print job for the printer. The new print job status may be applied to the priority determination unit to generate executable new printing instructions, and the new printing instructions may be executed.

An embodiment of the method may include initiating a new function call to POST a new message to the cloud printer server after executing the printing instructions. A new print job status may be obtained from the cloud printer server regarding the existence of a new high priority print job for the printer. The new print job status may be applied to the priority determination unit to generate executable new printing instructions, and the new printing instructions may be executed.

In an embodiment of the method, the external hardware device app may be located on at least one of a smart phone, a laptop, a personal computer, a cloud server, and combinations thereof. In an embodiment of the method, executing the printing instructions for the high priority print job may include printing all of the at least one high priority pages with the printer.

An embodiment of a printing apparatus may comprise a processor, a print engine, and a memory. The memory may store instructions that, when executed by the processor, configure the printing apparatus to pause a current print job on the printing apparatus, wherein the current print job includes a plurality of pages. An external interpreter on an external device may be pinged for a print job status comprising an existence of a pending high priority print job for the printing apparatus. The external interpreter may include logic to generate high priority raster data from a page description language (PDL). The print job status may be applied to a priority determination unit, wherein the priority determination unit includes logic to determine if a high priority print job exists or does not exist and to generate executable printing instructions for the printing apparatus and the external interpreter. On condition that a high priority print job exists, the executable printing instructions may comprise operating the external interpreter to generate high priority raster data for the high priority print job, receiving the high priority raster data for the high priority print job from the external interpreter, operating the print engine on the high priority raster data to generate at least one high priority page, operating the printing apparatus to print the at least one high priority page, and executing the printing instructions. On condition that a high priority print job does not exist, the executable printing instructions may comprise operating the printing apparatus to print one page from the current print job, and executing the printing instructions.

An embodiment of the printing apparatus may be configured to ping the external interpreter on the external device again, after executing the printing instructions, to provide a new print job status. The new print job status may be applied to the priority determination unit to generate executable new printing instructions. Then the new printing instructions may be executed.

An embodiment of the printing apparatus may be configured to receive encrypted high priority raster data. The encrypted high priority raster data may be decrypted using the printing apparatus, thereby generating decrypted pages. The decrypted pages may then be printed on the printing apparatus.

In an embodiment of the printing apparatus, the external interpreter may be a software program installed on the external device. The external device may be at least one of a smart phone, a laptop, a personal computer, a cloud server, and combinations thereof.

In an embodiment of the printing apparatus, a local interpreter may be installed on the printing apparatus. The local interpreter may generate raster data from PDL data used in printing the page in the current print job by the print engine. The local interpreter may alternatively be in standby mode during the generating of the high priority raster data for the high priority print job.

The mechanisms that enable this solution are described in detail below and illustrated in the referenced figures.

Referring to FIG. 1, a system 100 comprises a queued job 1 102, a queued job 2 104, a queued job 3 106, a local interpreter 108, current print job raster data 110, high priority raster data 112, a priority determination unit 114, a print engine 116, an external interpreter 118, a resumed current print job 120, a high priority print job 122, and a paused current print job 124.

In the absence of a high priority print job, queued job 1 102, queued job 2 104, and queued job 3 106 may be processed, in order, by the local interpreter 108. The local interpreter 108 may convert PDL data from the queued jobs into raster data, and, with no interruption from the priority determination unit 114, send that current print job raster data 110 to the print engine 116.

In the presence of a high priority print job, the printer may be in the process of printing, for example, page 59 of a 75-page document. Once page 59 is completed, the priority determination unit 114 may detect a high priority job at the external interpreter 118. The local interpreter 108 may then pause all processing. Pages 1 through 59 may become the paused current print job 124. High priority raster data 112 may be sent from the external interpreter 118 to the print engine 116, which prints the high priority print job 122. Once transfer of the high priority raster data 112 is complete, the priority determination unit 114 may indicate that there is no longer a high priority job present at the external interpreter 118. The local interpreter 108 may immediately resume processing, and page 60 of the paused job may be the first page of the resumed current print job 120.

In an exemplary embodiment, the priority determination unit 114 may actively query a linked external interpreter 118 after each page of the queued job is printed to determine whether the external interpreter 118 has a high priority job ready to send. The priority determination unit 114 may also query a number of linked devices containing an external interpreter 118, may send out a beacon to contact any external interpreter 118 devices within an established network, or may query a dedicated cloud-based external interpreter 118. Upon receiving confirmation from an external interpreter 118 that a high priority print job 122 is ready, the priority determination unit 114 may signal the local interpreter 108 to pause the jobs in its queue. Once the high priority print job 122 is complete, the priority determination unit 114 may send out another query to confirm no more high priority jobs are waiting, then signal the local interpreter 108 to continue with its queued jobs.

In another embodiment, the external interpreter 118 may signal the priority determination unit 114 on a linked printer when it has high priority raster data ready to send, or when it is in the process of generating high priority raster data. Such a signal may flag the priority determination unit 114 to pause print jobs at the local interpreter 108 after the current page is complete. Jobs at the local interpreter 108 may remain paused until the high priority print job 122 is completely processed. Once the high priority print job 122 is complete, if no other high priority jobs have been flagged, the priority determination unit 114 may signal the local interpreter to continue where it left off.

Once the local interpreter 108 has resumed processing its print queue, the priority determination unit 114 may resume either querying between low priority job pages or accepting signals and pausing low priority jobs between pages. In either case, a printer may also be configured to query or accept signals from more than one external interpreter. These are only examples of how the methods and apparatus disclosed herein may accomplish the notification that begins a high priority print job. This signaling process may vary based on printing application and hardware configuration.

Figure 2:
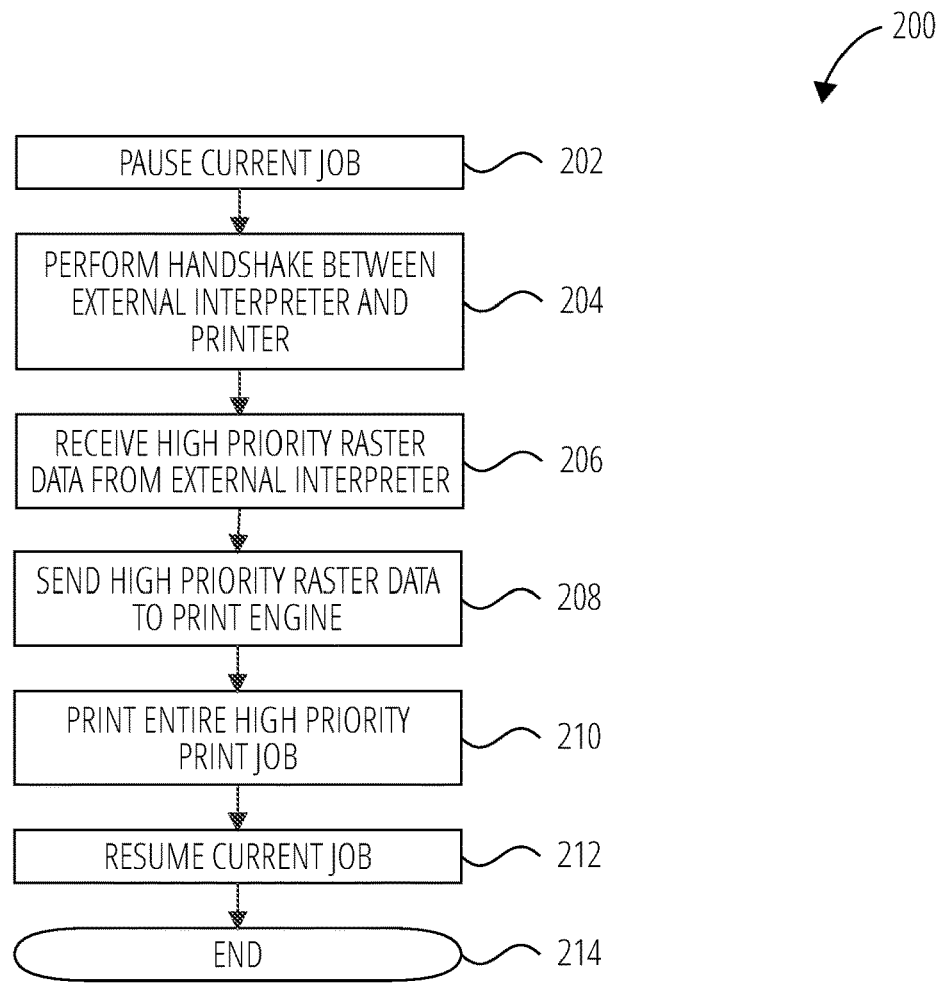
FIG. 2 illustrates a printing process 200 in accordance with one embodiment.

Referring to FIG. 2, a process 200 in accordance with one embodiment may begin at block 202 with pausing a current print job, in process of being printed by a printer or MFP.

In block 204, process 200 initiates a handshake between the printer or MFP and an external interpreter to determine whether or not a high priority print job is pending at the external interpreter.

In block 206 of process 200, when a high priority print job is present, the printer receives raster data for the high priority job from the external interpreter.

In block 208 of process 200, the printer sends the high priority raster data to a print engine.

In block 210, process 200 prints the high priority print job.

In block 212, process 200 resumes the current print job after the high priority print job is complete.

Process 200 ends at done block 214 when the current print job is complete. In some embodiments, the process may initiate additional handshakes after executing current printing instructions to obtain a new print job status, and execute new printing instructions based on that status.

Figure 3:
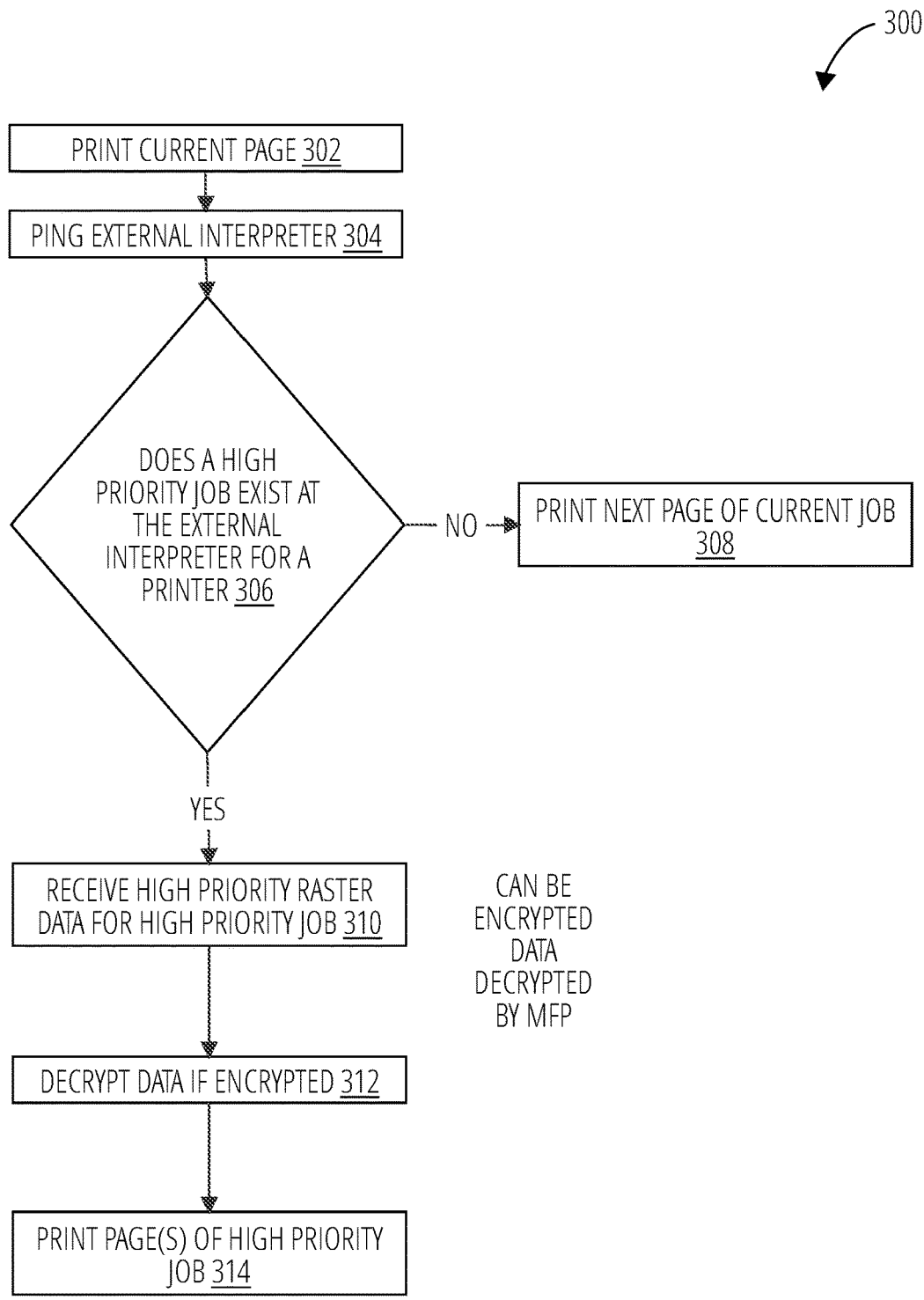
FIG. 3 illustrates a printing process 300 in accordance with one embodiment.

Referring to FIG. 3, in process 300, a printer or an MFP may interact directly with an external interpreter, with no changes to printer firmware needed.

In block 302, process 300 prints a current page of a current print job.

In block 304, process 300 pings the external interpreter once the current page is complete.

In decision block 306, a determination is made as to whether or not a high priority job is pending at the external interpreter. If there is no high priority job waiting, then the next page of the current print job is printed (block 308).

In block 310, on condition that a high priority job is present at the external interpreter, process 300 receives high priority raster data for the high priority job. High priority raster data may be encrypted. If it is, in block 312, process 300 decrypts the high priority raster data.

In block 314, process 300 prints at least one page of the high priority job.

Figure 4:
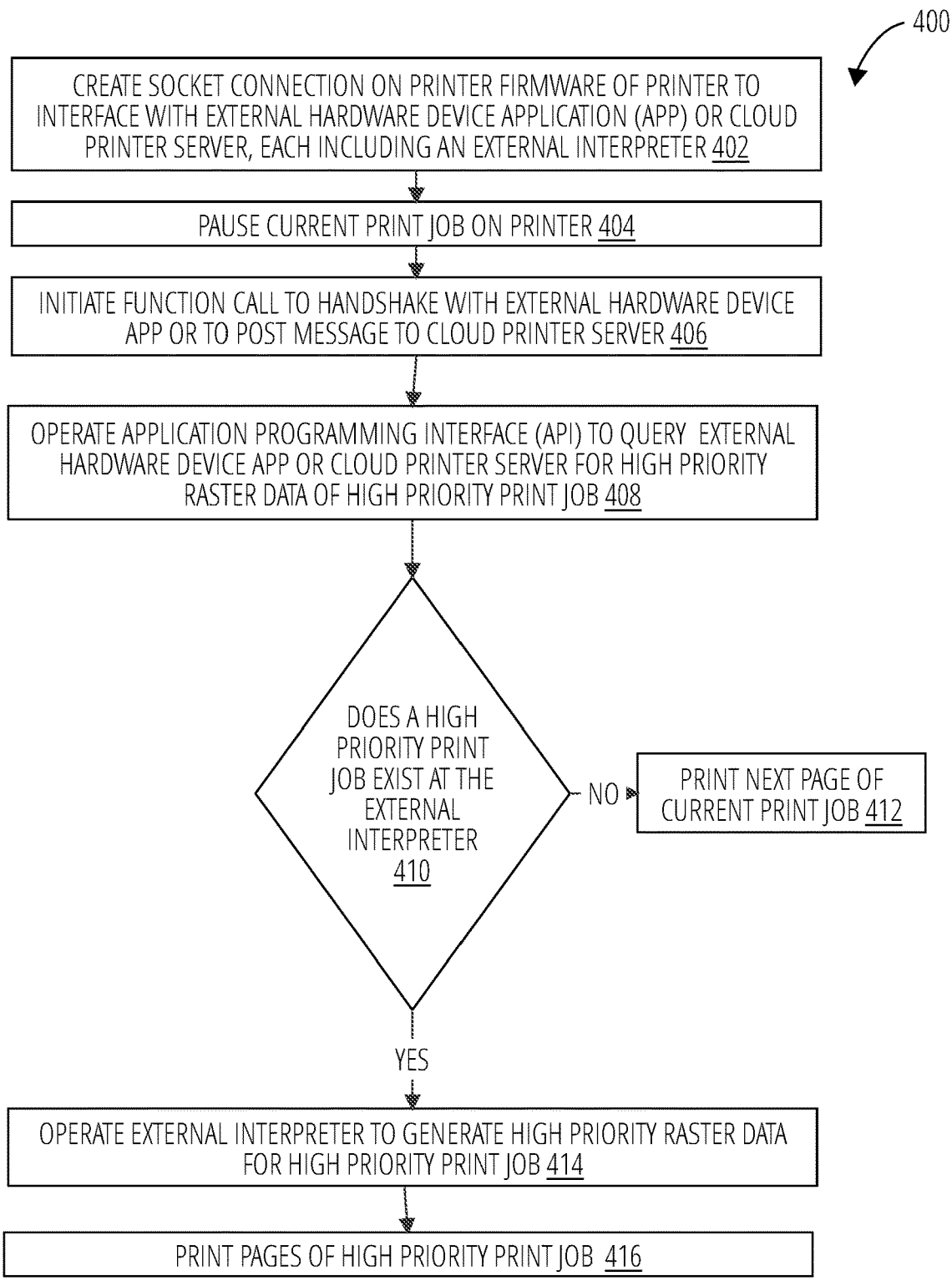
FIG. 4 illustrates a printing routine 400 in accordance with one embodiment.

Referring to FIG. 4, in routine 400, a printer or an MFP may have printer firmware that is not compatible with an external interpreter. In such a case, in block 402, routine 400 creates a socket connection on the printer firmware of the printer or MFP to interface with an external hardware device application (app) or a cloud printer server, each of which include an external interpreter.

In block 404, routine 400 pauses a current print job on the printer, wherein the printer includes a print engine, and the current print job includes a plurality of pages.

In block 406, routine 400 initiates a function call to handshake with the external hardware device app or to POST a message to the cloud printer server.

In block 408, routine 400 operates an application programming interface (API) to query at least one of the external hardware device app and the cloud printer server for high priority raster data of the high priority print job.

In decision block 410, a determination is made as to whether a high priority print job is pending at the external interpreter. If there is no high priority print job, then the next page of the current print job is printed (block 412).

In block 414, routine 400 operates the external interpreter to generate high priority raster data for the high priority print job.

In block 416, routine 400 operates the print engine on the high priority raster data to generate at least one high priority page.

Figure 5:
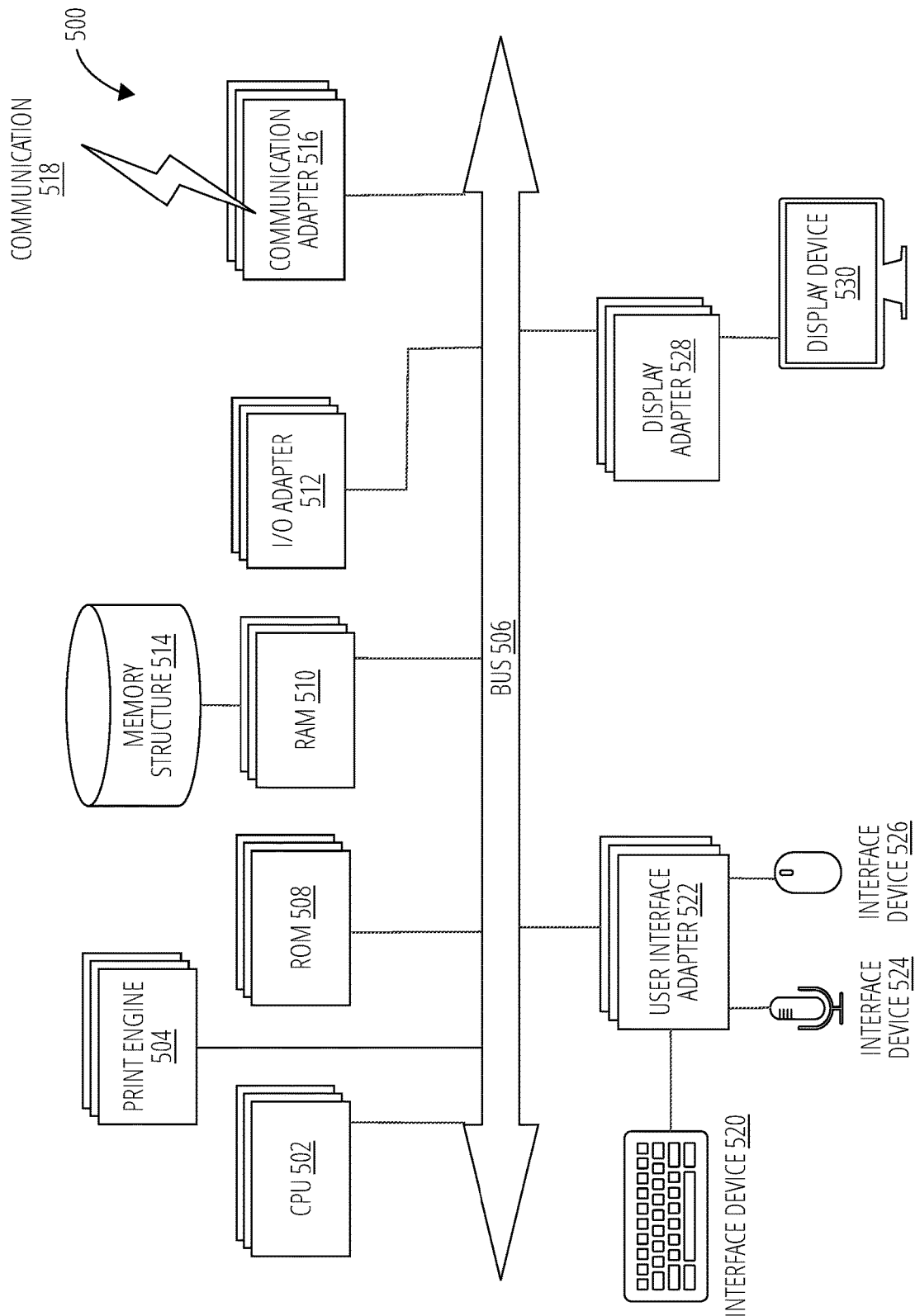
FIG. 5 illustrates an embodiment of a multifunction peripheral MFP 500.

Referring to FIG. 5, an multi-function peripheral (MFP 500) comprises a central processing unit (CPU 502), a print engine 504, a bus 506, a read-only memory (ROM 508), a volatile random-access memory (RAM 510), an input-output adapter (I/O adapter 512), a memory structure 514, a communication adapter 516 for sending or receiving a communication 518, an interface device 520, a user interface adapter 522, an interface device 524, an interface device 526, a display adapter 528, and a display device 530.

The CPU 502 is a processor that executes a process of an operating program of the MFP 500.

The print engine 504 is engaged during a printing process to control the production of printed pages based on raster data input.

The bus 506 facilitates communication between components within the MFP 500.

The ROM 508 is a nonvolatile memory for pre-storing the operating program and data.

The RAM 510 is a volatile memory employed as a work area, for temporarily storing the operating program and data upon executing the program. During a print job, the RAM 510 is where resources may be allocated for use by the local interpreter in converting incoming PDL data to raster data.

The memory structure 514 may be a hard disk allocated for long term data storage. For conventional high priority print job interruptions, resources for the current job allocated in RAM may need to be stored here while the high priority job is in process.

The I/O adapter 512 may include user input/output devices, network input/output devices, and/or other types of input/output devices. For example, user interface adapter 522 or the display adapter 528 may include user input/output devices such as a touch screen, a keyboard, a keypad, a computer mouse, printing components, liquid crystal displays (LCD), a document scanner, light emitting diodes (LEDs), displays using digital light processing (DLP) technology, cathode ray tubes (CRT), light bulbs, and/or other similar devices. The document scanner is a functional unit for scanning an image of a hardcopy manuscript and converting the scanned image to electronic data. Network input/output devices may include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of printing device network 600, and/or wireless network receivers and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of printing device network 600.

In an embodiment, communication adapter 516 is connected to a cloud printer server 612 through the internet 610 using a communication 518.

The user interface adapter 522 may control user interface devices (e.g., interface device 520, interface device 524, and interface device 526) that allow a user to provide printing instructions directly to the printer or MFP 500.

The display adapter 528 and display device 530 may provide visual feedback on commands and information on printer or MFP status to the user.

Figure 6:
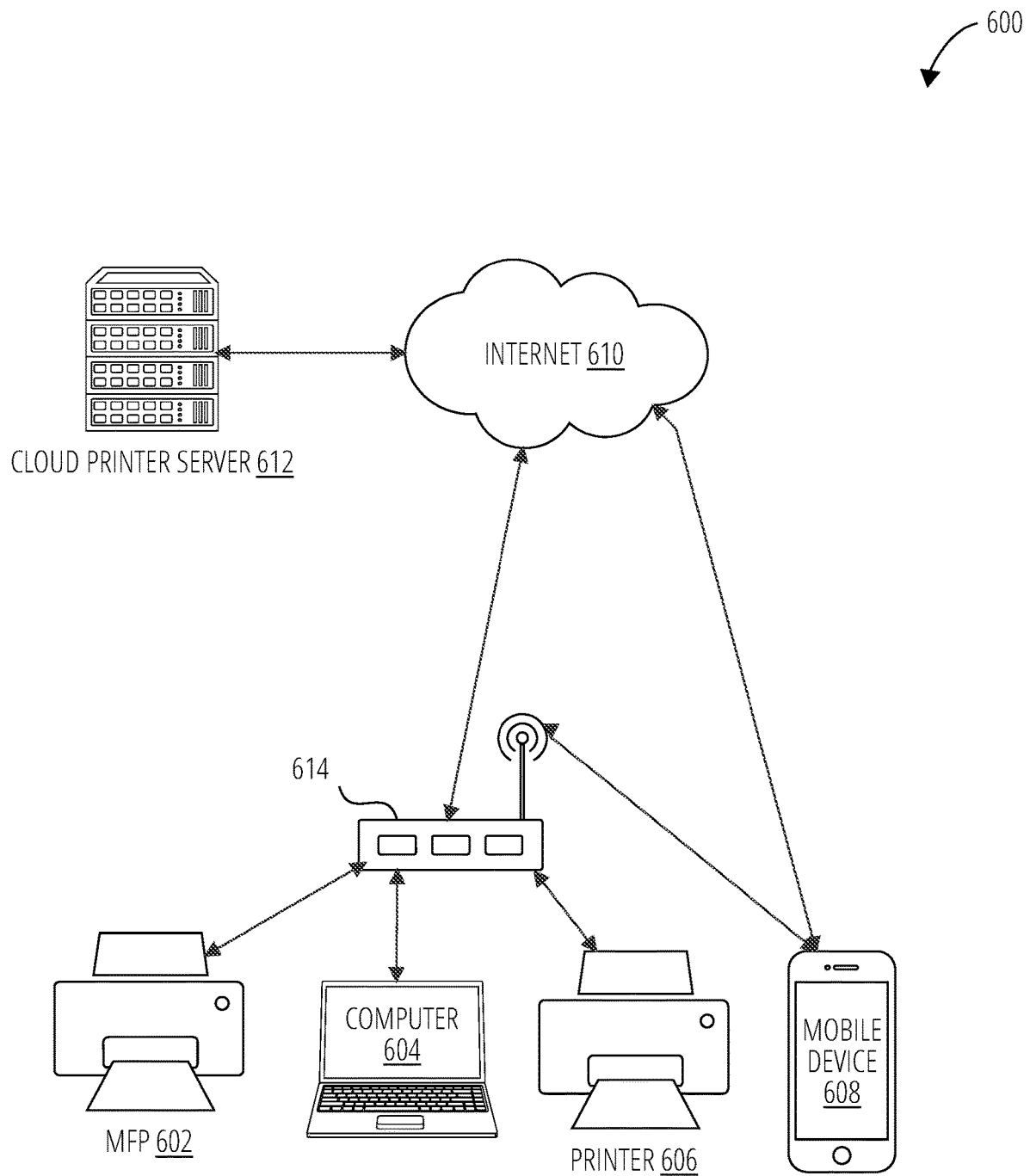
FIG. 6 illustrates a printing device network 600 in accordance with one embodiment.

Referring to FIG. 6, an example printing device network 600 includes an MFP 602, a computer 604, a printer 606, and a mobile device 608 connected to a switch/router 614. The switch/router 614 is connected to the cloud printer server 612 through the internet 610.

Computer 604 and mobile device 608 may be one of various types of electronic devices, such as a personal computer, a tablet computer, a smart phone, a server device, a wireless computing device, or any other type of computing device capable of connecting to a network and executing program instructions. Additionally, more or fewer computing devices and/or printing devices may be connected to switch/router 614 than depicted in FIG. 6. While the connections in FIG. 6 are depicted as wired links, any of these links may be replaced or enhanced with wireless links. Thus, any of the links shown in FIG. 6 may be, for example, Ethernet or Wi-Fi.

Printing devices MFP 602 and printer 606 may be configured to print partially-stored and/or fully-stored electronic documents on various types of physical output media. These output media include, but are not limited to, various sizes and types of paper, overhead transparencies, and so on. Printing devices MFP 602 and printer 606 may be interchangeably referred to as "printers."

Printing devices MFP 602 and printer 606 may serve as local peripherals to computer 604, such as a personal computer, a server device, a print server, etc. In these cases, printing devices MFP 602 and printer 606 may be attached to the computer 604 by a cable, such as a serial port cable, parallel port cable, Universal Serial Bus (USB) cable, Firewire (IEEE 1394) cable, or High-Definition Multimedia Interface (HDMI) cable. Thus, the computer 604 may serve as a source of electronic documents for printing devices MFP 602 and printer 606, and the computer 604 may be used to carry out the methods, processes, or functions disclosed herein.

On the other hand, printing devices MFP 602 and printer 606 may include a wireline or wireless network interface, such as an Ethernet or 802.11 (Wi-Fi) interface. So arranged, printing devices MFP 602 and printer 606 may serve as printing devices for any number of computing devices that can communicate with printing devices MFP 602 and printer 606 over a network. In some embodiments, any of printing devices MFP 602 and printer 606 may serve as both a local peripheral and a networked printer at the same time. In order to communicate with printing devices MFP 602 and printer 606, computing devices may use Simple Network Management Protocol (SNMP), Web Services Description Language (WSDL), Hypertext Transfer Protocol (HTTP), and/or any other communication protocols.

Any of printing devices MFP 602 and printer 606 may be considered to be a non-generic type of computing device and may carry out both printing-related and non-printing related tasks. For instance, printing device MFP 602 may also include copier, fax, and scanner functions. In some embodiments, printing device MFP 602 may use a scanning unit to facilitate copier and/or fax functions. For instance, printing device MFP 602 may scan a physical document into an electronic format, and then print the resulting electronic document to provide a copy, and/or transmit the resulting electronic document via a telephone interface to provide fax operation. Additionally, printing device MFP 602 may be able to receive a faxed electronic document via a telephone interface, and then compress and store a representation of this electronic document.

With respect to using the cloud printer server 612, a user may use a Cloud Service Raster Image Processor (RIP) that operates in a passive mode (i.e., it cannot initiate the communication between itself and the MFP 602). The MFP 602 has to tick the Cloud Service RIP first. In order for the Cloud Service to identify which MFP 602 in the network is making a query, each MFP 602 has an account registered to the Cloud Service (i.e., similar to a personal email account). Whenever the MFP 602 makes a query, it sends its own account information, and the Cloud Service first process the account information to determine which MFP 602 is making the request.

In an embodiment, the Cloud Service may not be able to initiate communication to MFP 602 because the MFP 602 web server is not exposed to the outside world for security reasons (e.g., virus, confidential documents etc.). However, an internet domain name may be assigned to the MFP 602 that would expose it to the world (i.e., similar to a regular website), allowing the Cloud Service to tick the target MFP 602 and inform it that it has an express job ready for its print engine.

Likewise, when a device sends an express job to the Cloud Service, it may also attach the target MFP 602 account information. There are at least three ways to accomplish this. First, there is a potentially unsecure method where the device that sends the express job to the Cloud Service already knows the account information of MFP 602, so the device does not need to query the target MFP 602 for its account information. Second, a potentially more secure method than the first one is where the device does not know the MFP 602 account information, and it first makes a connection with the target MFP 602 to ask for its account information, preferably in an encrypted format. Next, it uses the information obtained from MFP 602 to send the express job to the Cloud Service.

As a third method, a Cloud Service offers a personal account where each personal account may be associated with as many MFPs in the network as is necessary. Under this method, before sending an express job, the user first sends their personal account info to the Cloud Service, and the Cloud Service lists all the MFPs associated with that personal account. The user then selects the MFP of interest and sends that info to the Cloud Service before sending the express job's data.

In an embodiment, a requesting device initiates the function call to POST the message to the cloud printer server, and the cloud printer server comprises accounts with information associated individually with a plurality of printers. The requesting device may possess cloud printer server account information associated with the printer, without needing to request the cloud printer server account information from the printer, and the requesting device transfers the cloud printer server account information associated with the printer to the cloud printer server. In another embodiment, the requesting device may connect with the printer to request and obtain the cloud printer server account information of the printer, and the requesting device transfers the cloud printer server account information associated with the printer to the cloud printer server. In yet another embodiment, the requesting device may connect with the cloud printer server using a requesting device cloud printer server account, and the requesting device selects the printer associated with the requesting device cloud printer server account. The requesting device cloud printer server account may be associated with at least one printer.

Figure 7:
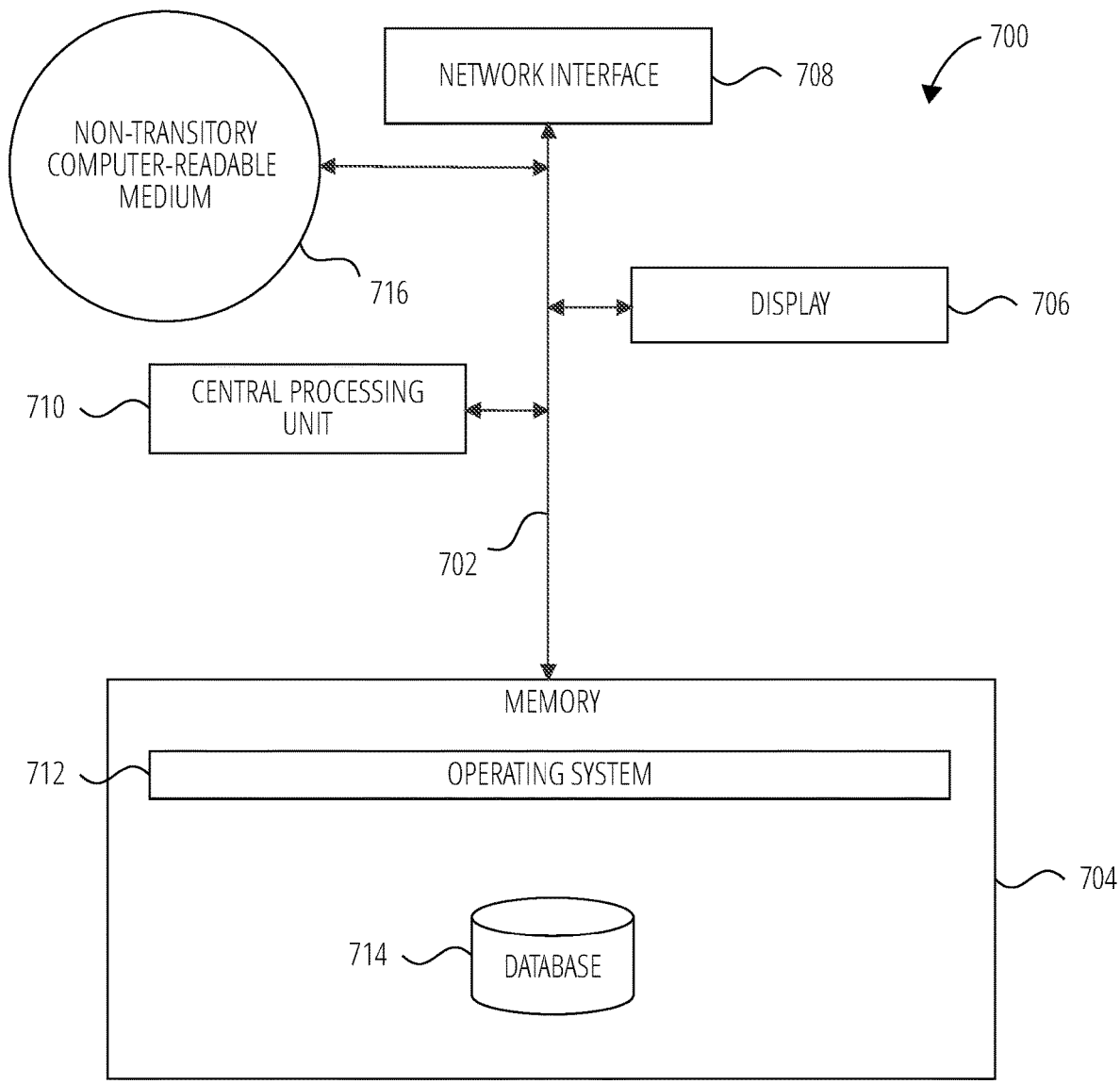
FIG. 7 illustrates a printing system 700 in accordance with one embodiment.

FIG. 7 illustrates several components of an exemplary printing system 700 in accordance with one embodiment. In various embodiments, printing system 700 may include a desktop personal computer (PC), server, workstation, mobile phone, laptop, tablet, set-top box, appliance, printer, MFP, or other computing device that is capable of performing operations such as those described herein. In some embodiments, printing system 700 may include many more components than those shown in FIG. 7. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, printing system 700 may comprise one or more physical and/or logical devices that collectively provide the functionalities described herein. In some embodiments, printing system 700 may comprise one or more replicated and/or distributed physical or logical devices.

In some embodiments, printing system 700 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash.; and the like.

Printing system 700 includes a bus 702 interconnecting several components including a network interface 708, a display 706, a central processing unit 710, and a memory 704.

Memory 704 generally comprises a RAM and permanent non-transitory mass storage device, such as a hard disk drive or solid-state drive. Memory 704 stores an operating system 712.

These and other software components may be loaded into memory 704 of printing system 700 using a drive mechanism (not shown) associated with a non-transitory computer-readable medium 716, such as a DVD/CD-ROM drive, memory card, network download, or the like.

Memory 704 also includes database 714. In some embodiments, printing system 700 may communicate with database 714 via network interface 708, a storage area network ("SAN"), a high-speed serial bus, and/or via the other suitable communication technology.

In some embodiments, database 714 may comprise one or more storage resources provisioned from a "cloud storage" provider, for example, Amazon Simple Storage Service ("Amazon S3"), provided by Amazon.com, Inc. of Seattle, Wash.; Google Cloud Storage, provided by Google, Inc. of Mountain View, Calif.; and the like.

Terms used herein should be accorded their ordinary meaning in the relevant arts, or the meaning indicated by their use in context, but if an express definition is provided, that meaning controls.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list, and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

The methods and apparatus in this disclosure are described in the preceding on the basis of several preferred embodiments. Different aspects of different variants are considered to be described in combination with each other such that all combinations that upon reading by a skilled person in the field on the basis of this document may be regarded as being read within the concept of the invention. The preferred embodiments do not limit the extent of protection of this document.

Having thus described embodiments of the present invention of the present application in detail and by reference to illustrative embodiments thereof, it will be apparent that modifications and variations are possible without departing from the scope of the present invention.

What is claimed is:

1. A method of prioritizing printing jobs, comprising:
pausing a current print job on a printer, wherein the printer includes a print engine, and the current print job includes a plurality of pages;
pinging an external interpreter on an external device for a print job status comprising an existence of a pending high priority print job for the printer, wherein the external interpreter includes first logic to generate high priority raster data from a page description language (PDL);
applying the print job status to a priority determination unit, wherein the priority determination unit includes second logic to determine if a high priority print job exists or does not exist and to generate executable printing instructions for the printer and the external interpreter, wherein the executable printing instructions comprise:
on condition that a high priority print job exists:
receiving the high priority raster data for the high priority print job from the external interpreter;
operating the print engine on the high priority raster data to generate at least one or more high priority pages; and
operating the printer to print the at least one or more high priority pages; and
on condition that a high priority print job does not exist:
operating the printer to print one page from the plurality of pages of the current print job; and
executing the printing instructions.

2. The method of claim 1, further comprising:
pinging the external interpreter on the external device again, after executing the printing instructions, to provide a new print job status;
applying the new print job status to the priority determination unit to generate executable new printing instructions; and
executing the new printing instructions.

3. The method of claim 1, further comprising:
receiving encrypted high priority raster data;
decrypting the encrypted high priority raster data using the printer, thereby generating decrypted pages; and
printing the decrypted pages on the printer.

4. The method of claim 1, wherein the external interpreter is a software program installed on the external device.

5. The method of claim 1, wherein the external device is at least one of a smart phone, a laptop, a personal computer, a cloud server, and combinations thereof.

6. The method of claim 1, wherein a local interpreter installed on the printer generates raster data from PDL data used in printing the page in the current print job by the print engine.

7. The method of claim 6, wherein the local interpreter is in standby mode during the generating of the high priority raster data for the high priority print job.

8. A method of printing, comprising:
creating a socket connection on a printer firmware of a printer to interface with an external hardware device application (app) or a cloud printer server;
pausing a current print job on the printer, wherein the printer includes a print engine, and the current print job includes a plurality of pages;
initiating a function call to handshake with the external hardware device app or to POST a message to the cloud printer server, wherein the external hardware device app and the cloud printer server include:
an external interpreter comprising first logic to generate high priority raster data from page description language (PDL) data;
a print job status; and
a priority determination unit, wherein the priority determination unit includes second logic to determine if a high priority print job exists or does not exist using the print job status and to generate executable printing instructions for the printer, wherein the executable printing instructions comprise:
on condition that a high priority print job exists:
operating an application programming interface (API) to query at least one of the external hardware device app and the cloud printer server for high priority raster data of the high priority print job;
operating the external interpreter to generate high priority raster data for the high priority print job;
relaying the high priority raster data to the print engine;
operating the print engine on the high priority raster data to generate at least one or more high priority pages; and
operating the printer to print the at least one or more high priority pages;
and
on condition that a high priority print job does not exist:
operating the printer to print one page from the plurality of pages of the current print job; and
executing the printing instructions.

9. The method of claim 8, further comprising:
initiating a new function call to handshake with the external hardware device app after executing the printing instructions;
obtaining a new print job status from the external hardware device app regarding the existence of a new high priority print job for the printer;
applying the new print job status to the priority determination unit to generate executable new printing instructions; and
executing the new printing instructions.

10. The method of claim 8, further comprising:
initiating a new function call to POST a new message to the cloud printer server after executing the printing instructions;
obtaining a new print job status from the cloud printer server regarding the existence of a new high priority print job for the printer;
applying the new print job status to the priority determination unit to generate executable new printing instructions; and
executing the new printing instructions.

11. The method of claim 8, wherein the external hardware device app is located on at least one of a smart phone, a laptop, a personal computer, and combinations thereof.

12. The method of claim 8, wherein:
a requesting device initiates the function call to POST the message to the cloud printer server;
the cloud printer server comprises accounts with information associated individually with a plurality of printers; and
the requesting device at least one of:
  possesses cloud printer server account information associated with the printer, without needing to request the cloud printer server account information from the printer, and transfers the cloud printer server account information associated with the printer to the cloud printer server;
  connects with the printer to request and obtain the cloud printer server account information of the printer and transfers the cloud printer server account information associated with the printer to the cloud printer server; or
  connects with the cloud printer server using a requesting device cloud printer server account and selects the printer associated with the requesting device cloud printer server account, wherein the requesting device cloud printer server account is associated with at least one printer.

13. A printing apparatus comprising:
a print engine; and
a memory storing instructions that, when executed by the processor, configure the printing apparatus to:
  pause a current print job on the printing apparatus, wherein the current print job includes a plurality of pages;
  ping an external interpreter on an external device for a print job status comprising an existence of a pending high priority print job for the printing apparatus, wherein the external interpreter includes first logic to generate high priority raster data from a page description language (PDL);
  apply the print job status to a priority determination unit, wherein the priority determination unit includes second logic to determine if a high priority print job exists or does not exist and to generate executable printing instructions for the printing apparatus and the external interpreter, wherein the executable printing instructions comprise:
    on condition that a high priority print job exists:
      operating the external interpreter to generate high priority raster data for the high priority print job;
      receiving the high priority raster data for the high priority print job from the external interpreter;
      operating the print engine on the high priority raster data to generate at least one or more high priority pages; and
      operating the printing apparatus to print the at least one or more high priority pages; and
    on condition that a high priority print job does not exist:
      operating the printing apparatus to print one page from the plurality of pages of the current print job;
      and
  execute the printing instructions.

14. The printing apparatus of claim 13, further comprising configuring the printing apparatus to:
  ping the external interpreter on the external device again, after executing the printing instructions, to provide a new print job status;
  apply the new print job status to the priority determination unit to generate executable new printing instructions; and
  execute the new printing instructions.

15. The printing apparatus of claim 13, further comprising configuring the printing apparatus to:
  receive encrypted high priority raster data;
  decrypt the encrypted high priority raster data using the printing apparatus, thereby generating decrypted pages; and
  print the decrypted pages on the printing apparatus.

16. The printing apparatus of claim 13, wherein the external interpreter is a software program installed on the external device.

17. The printing apparatus of claim 13, wherein the external device is at least one of a smart phone, a laptop, a personal computer, a cloud server, and combinations thereof.

18. The printing apparatus of claim 13, wherein a local interpreter installed on the printing apparatus generates raster data from PDL data used in printing the page in the current print job by the print engine.

19. The printing apparatus of claim 18, wherein the local interpreter is in standby mode during the generating of the high priority raster data for the high priority print job.

20. The printing apparatus of claim 13, further comprising:
  configuring the printing apparatus to:
    receive compressed high priority raster data;
    decompress the compressed high priority raster data using the printing apparatus, thereby generating decompressed pages; and
    print the decompressed pages on the printing apparatus.

* * * * *